Patented Feb. 1, 1938

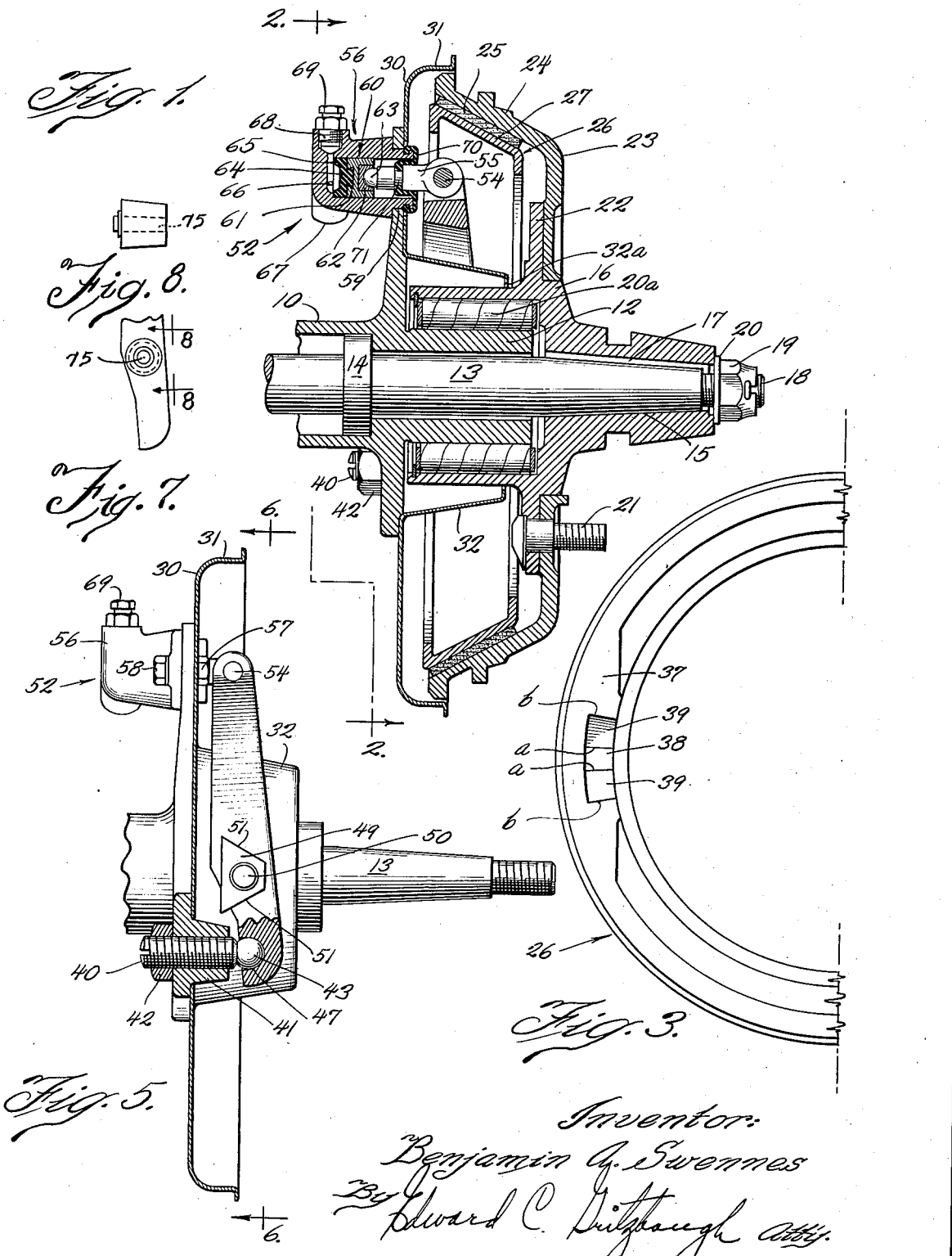

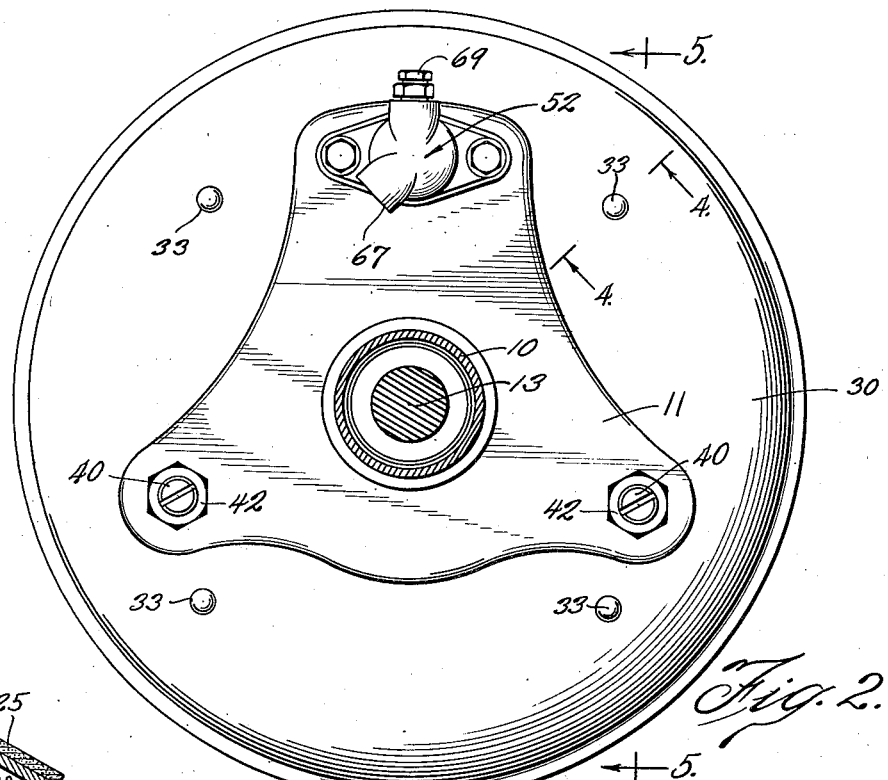
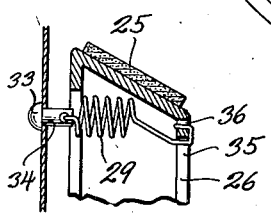
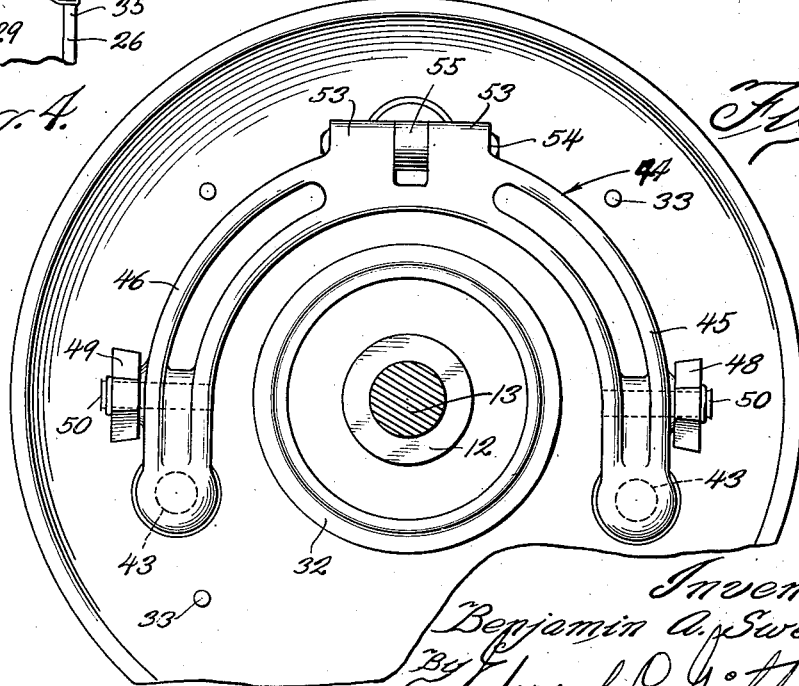
Inventor:
Benjamin A. Swennes

2,107,091

UNITED STATES PATENT OFFICE 2,107,091

BRAKE

Benjamin A. Swennes, Rockford, Ill., assignor to Borg-Warner Corporation, Chicago, Ill., a corporation of Illinois Application September 7, 1935, Serial No. 39,522

10 Claims. (Cl. 188—71)

This invention has to do with a brake, and relates more particularly to improvements in a vehicle brake.

An object of the present invention is the provision of an improved vehicle brake employing continuous conical braking elements relatively axially movable into and out of braking engagement.

Another object of the present invention is the provision of a new brake wherein braking power is augmented by servo action upon conical friction elements.

Another object of the present invention is the provision of a novel brake capable of great braking power with but a small pressure per unit area and a concomitant preservation of brake lining.

Another object of the present invention is the provision of a novel brake including an axially movable arcuate braking member having a servo camming section with camming surfaces having surface elements disposed radially of such arcuate member.

Still another object of the present invention is the provision of an improved brake capable of maintaining relatively high braking power throughout a series of vigorous braking applications made in rapid succession.

With the above and other desirable objects in view, one form of the invention is hereinafter set forth and described in conjunction with the accompanying two sheets of drawings hereby made a part of this specification, and wherein:

Fig. 1 is a fragmentary section taken through the rear axle housing and wheel hub of an automobile, and illustrating the combination therewith of a form of the present invention;

Fig. 2 is a sectional elevation taken on the line 2—2 of Fig. 1;

Fig. 3 is a fragmentary side view of an internal brake member comprising a part of the brake mechanism shown in Fig. 1;

Fig. 4 is a fragmentary sectional view taken on the line 4—4 of Fig. 2;

Fig. 5 is a sectional view of the device taken on the line 5—5 of Fig. 2;

Fig. 6 is an end view of the device, taken on the line 6—6 of Fig. 5;

Fig. 7 is a fragmentary view of the leg of a yoke used in the present brake structure and illustrating the use of a conical roller thereon; and Fig. 8 is a side elevation of the conical roller shown in Fig. 7, the view being taken on the line 8—8 of Fig. 7.

Like reference characters are used for designating similar parts shown in the various figures of the drawings and described hereinafter.

Reference should first be had to Fig. 1 wherein the device is illustrated as it may be applied to a rear wheel of an automobile. The reference character 10 designates an end of an axle housing which is secured non-rotatively in any conventional manner to the running gear of the vehicle. A generally triangular flange 11, shown in Figs. 1 and 2, may be formed integrally with the axle housing 10, and provides a support for brake actuating mechanism hereinafter described. The axle housing 10 comprises a bearing section 12 through which there extends an axle 13. Endwise movement of the axle 13 in one direction may be prevented by a collar 14 secured to the axle and abutting against an end of the housing bearing 12. The collar 14 serves as a seal to preclude the leakage of lubricant from the axle housing.

Keyed to the outer tapered end section 15 of the axle 13 is a wheel hub 16, the keyed connection being shown at 17. The extreme end section 18 of the axle 13 is threaded and has a nut 19 turned thereon for pressing a washer 20 against the outer end of the wheel hub 16 whereby to hold the hub in place upon the axle. The hub 16 is journalled upon the exterior of the bearing 12 by means of roller bearings 20a.

A plurality of bolts 21 are passed through a suitably apertured flange 22, and are there used for securing a brake drum 23 to the wheel hub 16. The bolts 21 may be of such a length as to pass through and beyond the brake drum, thus adapting them to engage a wheel (not shown) for holding the same upon the hub 16. The peripheral section 24 of the brake drum 23 is of conical formation, such section embodying one of the friction elements of the brake. From the description thus far given, it will be conceived that the axle 13, the hub 16, the brake drum 23 and a wheel (not shown) attached by means of bolts 21 to the hub 16 are interconnected so as to rotate together as a unit relatively to the axle housing 10 and parts presently to be described supported upon the axle housing.

An internal brake member 26 is provided. The brake member 26 may be of cast metal and has a conical section 27 whose external surface is of the same pitch as that of the brake drum section 24. The internal brake member is in the general shape of a hoop of which a half portion is shown in Fig. 3. A hoop-like friction element 25 extends continuously about the internal brake member 26 in opposed relation with the friction element 24 of the brake drum 23. Ordinarily, the friction band 25 will be secured to the internal brake member 26 by means of rivets, not shown.

Retracting means for the internal brake member 26 is provided by a number of helical contraction springs 29 of which one is shown in detail in Fig. 4. In the present embodiment of the invention four springs 29 are employed. The internal brake member 26 is movable longitudinally of the axle 13, but is normally held retracted from the brake drum by the springs 29. Fastened to the flange 11 of the axle housing 10 is a circular dust guard 30 having a short peripheral flange 31 and a cone shaped central section 32 containing a large central opening 32a. The dust guard 30 is plainly illustrated in Figs. 1, 2, and 5. In Fig. 2 there are shown the heads of four pins 33, which extend through apertures 34 spaced equi-angularly about the dust guard 30. Pins 34 are used as an anchorage for one end of each of the springs 29. The opposite ends of the springs 29 are hooked about an internal flange 35 of the brake member 26 and extended into apertures 36 in said flange.

Within diametrically opposed reinforced sections 37 of the brake member 26 (one of such sections being shown in Fig. 3) are formed camming sections 38. Each of the camming sections comprises opposed converging camming surfaces 39 formed by casting or otherwise effecting a notch in the reinforced sections 37 and machining the opposed surfaces 39 to make the latter smooth. It is to be noted that the camming surfaces 39 have surface elements arranged radially of the internal brake member 26; that is, the edges designated "a" and "b" of the respective camming surfaces 39 are on lines extending radially of the brake member in contradistinction to parallel lines.

Actuating mechanism for shifting the internal brake member 26 axially into engagement with the rotatable brake drum 23 for braking the latter will now be described. Within each of the two lower corners of the substantially triangular flange 11 are anchored threaded pivot posts 40. Any position of the pivot posts 40 axially of the device may be selected by turning such posts within their respective threaded sections 41 of the flange 11. The selected axial position of the posts 40 may be maintained by thereafter tightening the lock nuts 42 against the inner face of the flange 11. A spherical section 43 is provided upon the outer end of each of the pivot posts 40. Pivotally supported upon the outer ends of the posts 40 is a yoke 44 having legs 45 and 46 disposed upon opposite sides of the inner cone-like configuration 32 of the dust guard 30. A full side view of the yoke 44 is shown in Fig. 6. Recesses 47 having hemispherical concavities receive the outer rounded ends of the pivot posts 40, the pivot posts thus effecting a mounting for the yoke 44.

Pivotally attached to the legs 45 and 46 of the yoke 44 are similarly formed cams 48 and 49. A side view of the cam 49 is shown in Fig. 5. Pivot pins 50 are anchored within the legs 45 and 46 for holding the cams 48 and 49 thereon. Each of the cams 48 and 49 has camming surfaces 51 for cooperating with the camming surfaces 39 of the cam sections in the internal brake member 26. The camming surfaces 51 are so spaced and are of such a contour as to cause them to fit flatly against their respective camming surfaces 39 during operation of the device. The springs 29 are effective to constantly maintain an engagement between the cam sections 38 and the cams 48 and 49.

Pivotal movement of the yoke presses the cams forcefully into the camming sections 38 and for pressing the internal brake member into frictional braking engagement with the brake drum 23. Hydraulically energized means for pivoting the yoke 44 is indicated generally by the reference character 52 in Figs. 1, 2 and 5. Paired lugs 53 formed within the upper section of the yoke 44 have a pintle 54 passed therethrough. Upon the pintle there is pivotally disposed a link 55. A cylinder 56 is secured to the inner face of the flange 11 by means of bolts 57 and nuts 58 thereon. The right end of the cylinder 56 is open and extends through a suitable aperture 59 in the flange 11. Within the cylinder 56 is a piston 60 consisting of a cup 61 containing a seat 62 for receiving the rounded end 63 of the link 55. Interlocked with the base of the cup 61 is a sealing member 64 having a skirt 65 extending to the left therefrom, Fig. 1. It is the function of the compoundly constructed piston 60 and of the skirted member 64 to prevent the leakage of fluid therepast within the cylinder when fluid is introduced under pressure into the left end of the cylinder through the bore 66 formed within the section 67 for the connection of a fluid supply conduit (not shown).

An air exhaust port 68 is communicative with the interior of the cylinder 56 to permit of the escape of air, and thus facilitate the filling of the fluid braking system with a fluid pursuant to placing the system in condition for operation. After the system has been filled with fluid, the opening 68 is closed by means of the screw cap 69.

When fluid is introduced under pressure into the left end of the cylinder 56, the piston 60 and the connecting link 55 will be moved to the right, thereby pivoting the yoke 44 upon the pivot posts 40. The bore of the cylinder 56 is greater in diameter than the diameter of the link 55, thus providing a space for the insertion of a flexible dust guard 70, usually of rubber, between the cylinder wall and the portion of the link extending into the cylinder. The outer end of the dust guard 70 is doubled about and contracted upon the right end of the cylinder wall while the left end of the dust guard 70 extends into the cylinder, and is contracted upon and into a circular groove 71 formed within the link 55. Reciprocal movement of the link 55 pursuant to applying and releasing the brake device is unimpeded by the flexible member 70 and the flexibility of said member prevents it from being impaired by the movement of the link relative to the cylinder wall. The device is not restricted to actuation by the particular type of fluid energized means here illustrated, nor is it restricted to operation by a fluid energized device of any kind. The yoke 44 may be pivoted by any suitable type of mechanical device.

The operation of the brake is as follows:

Normally, the springs 29 hold the brake member 26 and the friction element 25 to the left, Fig. 1, out of engagement with the conical friction element of the brake drum 23. When it is desired to effect a braking action between the friction elements 24 and 25, fluid pressure is applied, in any manner well known in the art, to the piston 60 for moving such piston, the link 55 and the upper section of the pivoted yoke 44 to the right, whereby to press the cams 48 and 49 into the cam sections 38 of the brake member 26. It is to be noted that the cams 48 and 49 are mounted upon the yoke in a manner as to be diametrically opposite with respect to the axis of axle 13. When the cams 48 and 49 are pressed against the camming sections 38 of the brake member 26, the camming surfaces 51 will bear more firmly against the camming surfaces 39. Incident to the friction element 25 engaging the element 24, there will be a tendency for the friction element 25 and the internal brake member 26 to follow the movement of the wheel (not shown) and brake drum, and as a consequence, there will be a camming action between one of the camming surfaces 51 of each of the cams 48 and 49 and its mating camming surface upon the internal brake member. In this way, a servo action for more tightly engaging the friction elements of the brake is produced.

Since the camming surfaces 39 have surface elements extending radially of the internal brake member 16, assurance is had of continued flat engagement between such surfaces and their respective complemental camming surfaces 51 upon the cams 48 and 49 while sliding upon one another during the servo camming action. In this way, a free flat sliding contact is maintained, and which would not be the case if the sliding surfaces were permitted to tilt relatively to each other thereby creating a tendency for the material at the edge or corner of one of the sliding surfaces to dig into the other. The provision of this improved servo action has been found to reduce materially the amount of brake applying force necessary upon the brake pedal in the driver's compartment of a vehicle.

If desired, the cams 48 and 49 may be replaced by frusto conical rollers 75 shown in Figs. 7 and 8. Where, therefore, the term "cam" is employed in the appended claims it is to be construed generically to embrace either a cam in its strictest sense, a roller, or any device operative to deflect the internal brake element.

Upon a subsequent release of fluid pressure behind the piston 60 within the cylinder 56, the force component of the cams 48 and 49 opposing rotation of the internal brake member 26 will be terminated; the member 26 will thus be permitted to rotate a slight amount with the brake drum whereupon the camming sections of the member 26 will deflect the yoke 44 and the cams thereon inwardly. Thus the action of the cams and their co-acting cam surfaces upon the brake member cooperate with the springs 29 in the release of the brake, for the only resistance, if any, the arms and yoke may offer the spring force in certain instances would be in virtue of their inertia. Should the cams 48 and 49 and the camming sections of the internal brake member 26 operate to retract the yoke 44 more slowly than the springs 29 operate to retract the internal brake member, the springs will retract the whole assembly including the internal brake member, the cams and the yoke. The manner in which the yoke 44, the cams 48 and 49, and the internal axially movable brake member of the present device are actuative incident to brake release, prevents all likelihood of locking of the brake members, thus obviating the principal objection to many brakes employing the servo principle of operation. In Fig. 5 it can be seen that the return movement of the yoke 44 under the influence of springs 29 is limited by the heads of bolts 57. By thus limiting the movement of the yoke, it is prevented from coming in contact with the sealing member 64 and injuring the same.

Application of the brake while the wheel hub 16 is rotating in one direction will result in the camming surface 51 on one side of the cams 48 and 49 cooperating with one set of camming surfaces 39 to bring about the servo action, whereas the other camming surfaces 51 of said cams will cooperate with the other set of camming surfaces 39 to produce similar servo action when the brake is applied while the wheel hub is rotating in the opposite direction.

Particularly is attention directed to the simplicity of design and ruggedness of construction of the device herein shown. The brake actuating means proper includes but a single movable member, namely, the yoke, 44, for advancing the axially movable friction element into engagement with the rotatable element 24. The mechanism is compact inasmuch as it is confined within the space embraced by the brake drum of the wheel hub and the guard therefor.

A brake constructed in accordance with the present disclosure is especially adapted to withstand severe service. This has been demonstrated by numerous "fatigue" tests, which consist of a series of brake applications in rapid succession for decelerating a vehicle from high speed to a dead stop. The brake has been found to maintain its braking efficiency much longer during a "fatigue" test than do conventional vehicle brakes. This is attributable in part to the greater surface area of brake band upon the continuous circular coniform element 25, whereby the braking force per unit area is diminished. Also the pressure is uniformly distributed over the braking area of the friction element 25. In this respect it is to be noted that the conical internal brake member 24 may be made as heavy as desired to give to it the rigidity required to prevent its straining under the pressure exacted thereon through the yoke 44 and the cams 48 and 49. Likewise, the yoke 44 may be constructed with legs of a thickness adapting them to carry the force applied thereto without perceptible strain. Elimination of strain in the brake actuating parts is essential to precision in operation. Each leg of the yoke 44 serves as a lever through which but a part of the braking force is transmitted. This, together with the fact that the legs of the yoke are short and are subjected to no torsional stress makes it possible to employ a relatively light yoke.

I claim as my invention:

1. A brake comprising an arcuate axially displaceable friction member, an axially movable cam for displacing said friction member, a pivoted brake actuating member in support of said cam and actuative incident to a pivotal movement thereof to cause such axial movement of the said cam and said friction member.

2. A brake comprising an arcuate axially displaceable friction member having a servo camming section, a pivoted brake actuating member, a servo cam on said member, said cam being pressed against such camming surface to effect axial displacement of said friction member, incident to a pivotal movement of said pivoted member.

3. A brake comprising an arcuate axially displaceable friction member having a servo camming section, a brake actuating member pivotal about an axis substantially normal to the axis of said friction member, a servo cam on said member, said cam being pressed against such camming surface to effect axial displacement of said friction member coincidental with a pivotal movement of said pivoted member.

4. A brake comprising arcuate relatively axially movable friction members, one of said members having a servo camming surface, a brake applying member pivotal about an axis normal to and at one side of the axis of said friction members, and a cam on said brake applying member at a section removed from such normal pivotal axis thereof and movable with said brake applying member to apply pressure against such camming surface for co-engaging said friction members coincidental with a pivotal movement of said brake applying member.

5. A brake comprising arcuate relatively axially movable friction members, one of said members having servo camming surfaces, a support member, a substantially U-shaped brake applying member disposed with a leg thereof on each side of the axis of said friction members, each leg being pivotally connected with said support member, and a cam upon each leg of said U-shaped member and movable therewith to apply pressure against such camming surfaces for co-engaging said friction members coincidental with a pivotal movement of said brake applying member.

6. A brake comprising arcuate relatively axially movable friction members, one of said members having servo camming surfaces, a support member, a yoke having end sections of its legs pivotally mounted upon said support, yoke pivoting means comprising means for applying force to said yoke axially of said friction members, and a cam upon each leg of said yoke and movable therewith to apply pressure against such camming surfaces thereby effecting co-engagement of said friction members, coincidental with a pivotal movement of said yoke.

7. A brake comprising a brake support member, an arcuate friction element movable both axially and rotatively and having a cam section including opposed inclined camming surfaces thereon, a complemental friction member to be braked by said movable friction member and adapted to limit axial movement thereof, a brake applying member pivoted upon said support member, a cam on said pivoted member and having cam surfaces between and in opposed relation with the cam surfaces of said friction member, and means for pivoting said brake applying member axially of said arcuate friction member thereby pressing said cam against the cam section of said friction member and causing said friction member to move axially into engagement with the friction member to be braked thereby.

8. In a brake, an arcuate friction member having a servo camming section thereon, such camming section including opposed inclined camming surfaces having surface elements disposed radially of said arcuate member.

9. In a brake for a wheel having a friction element thereon, a friction member movable rotatively and axially of said wheel into engagement with such friction element, there being servo camming sections on said friction member and having opposed inclined camming surfaces, a support member, a yoke having a main body disposed in a plane substantially parallel with the plane of said wheel and with the legs thereof on opposite sides of the axis of said wheel, a pivotal connection between such legs and said support member permitting of movement of the main body of said yoke toward and away from such wheel friction element, servo cam members pivoted upon the legs of said yoke, said cam members being disposed between the camming surfaces of such cam sections and compressible thereagainst to effect an initial engagement between said friction member and friction element during movement of the yoke main body toward said element, said cam members having inclined camming surfaces for abutting against the camming surfaces of the rotatable friction member and limiting rotation thereof with the wheel friction element, the inclination of such camming surfaces being such as to deflect the friction member toward said friction element incident to precluding rotation of said friction member.

10. A brake comprising a rotatable brake drum, an axially movable brake element for frictionally engaging said drum to resist rotation thereof, said brake element having limited rotative movement with said drum, means yieldingly urging said element away from said drum, a brake actuating member advanceable in one direction by a brake applying force, a deflecting member upon said actuating member and adapted to advance said movable element into an initial frictional engagement with said drum incident to such movement of said brake actuating member, such initial frictional engagement of the movable element and drum causing such limited rotation of the brake element with the drum, said deflecting member being disposed for deflecting said brake member into a final frictional engagement with said drum coincidental with such limited rotation of said element; and said element, said deflecting member and said brake actuating member being unitarily retractable by said yieldingly urging means upon cessation of the brake applying force.

BENJAMIN A. SWENNES.